(12) United States Patent
Ferguson

(10) Patent No.: US 7,734,671 B1
(45) Date of Patent: Jun. 8, 2010

(54) METHOD OF SORTING TEXT AND STRING SEARCHING

(75) Inventor: Michael P. Ferguson, Washington, DC (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 384 days.

(21) Appl. No.: 11/973,585

(22) Filed: Oct. 9, 2007

(51) Int. Cl.
*G06F 17/30* (2006.01)

(52) U.S. Cl. .............................. 707/999.102; 707/736; 707/741; 707/742; 707/752; 707/753; 707/705

(58) Field of Classification Search ................. 707/736, 707/741, 752, 753
See application file for complete search history.

(56) References Cited

U.S. PATENT DOCUMENTS

| 6,535,642 | B1 | 3/2003 | De Bonet | |
| 6,751,624 | B2 * | 6/2004 | Christal et al. ..................... | 1/1 |

OTHER PUBLICATIONS

Structuring labeled trees for optimal succinctness, and beyond, IEEE, 2005, Ferragina et al.*
An experimental study of an opportunistic index, pp. 269-278, ACM, 2001, Ferragina et al.*
An analysis of the Burrows—Wheeler transform, ACM, 2001, pp. 407-430, Giovanni Manzini.*
U.S. Appl. No. 10/916,370, filed Aug. 25, 2005, Levin et al.
P. Ferragina et al.; "An Experimental Study of an Opportunistic Index"; Proceedings of the 41st Annual IEEE Symposium on Foundations of Computer Science; pp. 390-398, 2000.
R. Grossi et al.; "When Indexing Equals Compression: Experiments with Compressing Suffix Arrays and Applications"; Proc. SODA '04, pp. 636-645, 2004.
V. Makinen et al.; "Advs. of Backward Searching—Efficient Secondary Memory and Dist. Impl. of Comp. Suffix Arrays"; Int'l Symp. on Algorithms & Computation; pp. 681-692,2004.
R. Baeza-Yates et al.; "Fast Text Searching for Regular Expressions or Automaton Searching on Tries"; Journal of the ACM, vol. 43, No. 6, Nov. 1996, pp. 915-936.

(Continued)

*Primary Examiner*—Jean M Corrielus
(74) *Attorney, Agent, or Firm*—Eric Froehlich; Robert D. Morelli

(57) ABSTRACT

A method of sorting text for memory efficient searching is disclosed. A FM-index is created on received text, and a number of rows are marked. The locations of the marked rows are stored in data buckets as well as the last column of the FM-index, which is stored as a wavelet tree. Data blocks containing the data buckets are created; containing the number of times each character appears in the data block before each data bucket. A header block is created comprising an array of the number of times each character appears in the last column of the FM-index before each data blocks, the location of the end of the data blocks and the location of the end of the data, and appended to the data block. The header and data blocks are stored. The search process loads data buckets into memory as needed to find the required text.

7 Claims, 3 Drawing Sheets

OTHER PUBLICATIONS

M. Burrows et al.; "A Block-sorting Lossless Data Compression Algorithm"; Digital Equipment Corporation SRC Research Report, May 10, 1994.

G. Navarro et al.; "Compressed Full-Text Indexes", ACM Computer Surveys, 2006.

Ho-Leung Chan et al.; "Compressed Indexes for Dynamic Text Collections", ACM Transactions on Algorithms, vol. 3, No. 2; Article 21; May 2007.

* cited by examiner

| Unsorted | Suffix Sort | Sorted Rotations | Rotations Sorted Starting with Second Character |
|---|---|---|---|
|  |  | F..L | LF |
| dab0 | 0 | 0dab | b0da |
| ab0d | 1 | 1r a | a1r |
| b0da | 2 | 2a b | b2a |
| 0dab | a1 | a1 r | ra1 |
| ra1 | ab0 | ab0d | dab0 |
| a1r | ab2 | ab 2 | 2ab |
| 1ra | b0 | b0da | ab0d |
| ab2 | b2 | b2 a | ab2 |
| b2a | dab0 | dab0 | 0dab |
| 2ab | ra1 | ra 1 | 1ra |

FIG. 2

| Unsorted | Suffix Sort | Sorted Rotations | After removing ambiguous rows |
|---|---|---|---|
| | | F.....L | F..L |
| dab#00$ | $ | $dab#00 | |
| ab#00$d | $ | $ra#0 1 | |
| b#00$da | $ | $ab#1 0 | |
| #00$dab | #00$ | #00$dab | #dab |
| 00$dab# | #01$ | #01$r a | #r a |
| 0$dab#0 | #10$ | #10$a b | #a b |
| $dab#0 | 0$ | 0$ab# 1 | |
| ra#01$ | 0$ | 0$dab#0 | |
| a#01$r | 00$ | 00$dab# | |
| #01$ra | 01$ | 01$ra # | |
| 01$ra# | 1$ | 1$ra# 0 | |
| 1$ra#0 | 10$ | 10$ab # | |
| $ra#01 | a#01$ | a#01$ r | a# r |
| ab#10$ | ab#00$ | ab#00$d | ab#d |
| b#10$a | ab#10$ | ab#10 $ | ab # |
| #10$ab | b#00$ | b#00$da | b#da |
| 10$ab# | b#10$ | b#10$ a | b# a |
| 0$ab#1 | dab#00$ | dab#00$ | dab# |
| $ab#10 | ra#01$ | ra#0 1$ | ra # |

FIG. 3

METHOD OF SORTING TEXT AND STRING SEARCHING

FIELD OF THE INVENTION

The present invention relates, in general, to data processing, and, in particular to manipulating data structures with compression.

BACKGROUND OF THE INVENTION

One prior art method of searching for a regular expression is scanning; that is, reading the input text one character at a time, checking for matches. However, as data volume increases, these O(n) scanning search strategies take longer and longer, and index-backed searching algorithms become of greater importance. It is known that regular expression searching can be achieved in sub-linear time (or o(n) time), using a suffix trie. However, suffix tries are normally considerably larger than the text they index.

Suffix arrays and compressed suffix arrays present a more space-efficient alternative to suffix tries. They provide similar functionality while normally occupying less space than the text they represent. In addition, there are compressed suffix array methods that provide for string searches in O(m) time, where m is the size of the string being searched for.

Each entry in a suffix array is an address into the original corpus. Therefore each entry uses log n bits (where the base of the log is 2). Note that the suffix array uses the original corpus during the search procedure. In total, the suffix array structure, along with the original text, is n+n log n bits. Note too that since the suffix array is sorted, rows beginning with a particular string are contiguous. The straightforward way to find the range of rows beginning with a particular string is to use two binary searches. Binary search always runs in O(log n) comparisons, but in this case, the comparisons are string comparisons and could take at worst m character comparisons. Thus, the search complexity is O(m log n). Persons skilled in the art will recognize that, in practice, the suffix array typically occupies 5n bytes since 4-byte pointers are convenient on modern hardware.

The Burrows-Wheeler transform is related to suffix arrays and leads to a kind of compressed suffix array that forms a conceptual n by n matrix M where each row is a rotation of the original text, in lexicographically sorted order. The Burrows-Wheeler transformation takes the last column of this matrix, L. Note that if the text is terminated with an end-of-file character that is lexicographically less than the other characters, the start positions of the strings in M are the same as the suffix array of that text.

The Burrows-Wheeler transform is reversible. The original text can be reconstructed from the L column. Note that every column of the matrix is a permutation of the characters in the original text. Furthermore, the first column, F, contains the characters of the text in alphabetically sorted order. Thus, if L is transmitted, F can be recovered from it by sorting. Assuming F and L, persons skilled in the art can move backwards in the original text. When Occ(ch,r) is defined as the number of times the character ch appears in the L column at or before row r, and C[ch] is defined as the number of instances of characters smaller than ch in the text, which is the same as the index of the first row in F that begins with ch, then for each row, the last-to-first column mapping is LF(i)=C[L[i]]+Occ (L[i],i)−1. This mapping provides a mechanism to step backwards. That is, if row r begins with T[3..] then LF(r) will give the index of the row starting with T[2..]. It is useful to think of the LF mapping as giving the row number of the row starting with the character L[i].

Ferragina and Manzini describe the FM-index, a string-searching index based on the Burrows-Wheeler transformation. Unlike a suffix array, however, the text may be discarded after the index is built. Given the Burrows-Wheeler transform of the corpus, the FM-index takes the L column and divides it into buckets of size b. It groups these buckets into super-buckets of constant size. Each super-bucket stores the number of occurrences since the start of the index for every character. Each bucket stores the number of occurrences since the super-bucket in addition to the compressed contents of its section of the L column. To find Occ(ch, i), where i is the row number, occurrence numbers from the super-bucket and the bucket are added in constant time and then the number of occurrences within the bucket up to row i must be counted while decompressing the bucket (taking O(b) time). Thus, each Occ computation takes O(b) time.

A method of searching text using a FM-index is known as a backward search, which computes the range of rows beginning with a particular string using O(m) Occ computations. Therefore, it takes O(m b) total time in Ferragina and Manzini's implementation.

An FM-index supports queries to find the location of a match. To reduce the size of the index, the FM-index stores location information for only a fraction of the rows. Given a mark character Z, the FM-index stores the offsets for each row in M ending with Z. To find the location of an occurrence in the original text, the FM-index uses the LF-mapping to go back until it finds a marked character. The mark character may be a character occurring with an appropriate frequency or a mark character. When using a specific mark character along with the text, the method must search for abra, aZbra, abZra, and abrZa (where Z is the mark character and the word being searched for is abra). In general, the implementation must search for min(k,m) patterns to do a single count operation.

The FM-Index implementation assumes that the compressed index fits into main memory, which translates into a limitation on the size of the corpus. In an application, larger corpuses must be divided into segments, where each segment is indexed separately, but each index must be queried in a search. Thus, the search time will be linear in the number of indexes. As a result, it is desirable to create large indexes.

When searching an FM-index that is larger than main memory, each operation might require a disk seek. In particular, the main process of using the LF-mapping to go backwards, is a random-access type process, and so each operation might require a disk seek time on the order of 6 ms.

To understand the magnitude of this problem, consider an FM-index built with the suggested parameter k=20 (marking 5% of the characters). Finding the location of a row takes 20*6 ms=0.12 s. Suppose that a user wants the location of 1000 rows (possibly returned by a count operation). Then their query could take about 2 minutes, including time for the count operation. At the same time, a modern hard disk can read data sequentially at around 50 MB/sec. Assuming the hard disk is the bottleneck, 6 gigabytes could be sequentially scanned to find matches in 2 minutes. Thus, in order for this FM-index to be faster than scanning, the collection would have to be larger than 6 gigabytes. As a result, a naive on-disk implementation of the FM-index does necessarily present a practical alternative to a scanning.

It is worth pointing out at this point that a solid state disk could potentially solve this problem. A flash memory "disk" of several gigabytes is relatively low cost and allows fast random access. Since the flash memory does not have a seek penalty, the FM-index implementation would perform much better. However, flash memory is more expensive than hard disks per gigabyte of storage, and the present invention is directed to improving the FM-index to operate better on a hard disk.

U.S. Pat. No. 6,535,642, entitled "APPROXIMATE STRING MATCHING SYSTEM AND PROCESS FOR LOSSLESS DATA COMPRESSION," discloses a method for compressing data employing an approximate string matching scheme. An encoder characterizes source data as a set of pointers and blocks of residual data. The pointers identify both the number of source data and their location, whereas the residual data identifies the distance between source data. The method compresses using entropy based compression scheme that takes into account the minimum entropy between the source data and the residual data. Text is retrieved by decompressing residual data by starting from a pre-determined offset of the first data block. Text is decoded in a backwards-searching scheme. The present method does not use source data and residual data. U.S. Pat. No. 6,535,642 is hereby incorporated by reference into the specification of the present invention U.S. Pat. No. 6,751,624, entitled "METHOD AND SYSTEM FOR CONDUCTING A FULL TEXT SEARCH ON A CLIENT SYSTEM BY A SERVER SYSTEM," discloses a method of searching text from a remote computer using a Burrows-Wheeler transform. After the text is compressed using the transform, the information is sent to the server, which decompresses the information and creates a suffix array. A second user may then search the information on the server. The invention does not address the issue of large data searches. The present method is not limited in this regard. U.S. Pat. No. 6,751,624 is hereby incorporated by reference into the specification of the present invention.

U.S. patent application Ser. No. 10/916,370, entitled "SYSTEM AND METHOD FOR PATTERN RECOGNITION IN SEQUENTIAL DATA," discloses a method of encoding sequential data. The method generates a symbol feature map that associates a feature with a symbol, and a set of associated statistics. Next, the method creates a set of sieves to sort the symbols. The method then passes a data vector through a selected sieve for processing, and if enough symbols align, stops processing, otherwise moving to another sieve. The present method does not decode symbols by passing data through a set of sieves. U.S. patent application Ser. No. 10/916,370 is hereby incorporated by reference into the specification of the present invention.

Known non-patents include:

"An experimental study of an opportunistic index" by P. Ferragina and G. Manzini, Proceedings of the 41$^{st}$ Annual IEEE Symposium on Foundations of Computer Science, pp. 390-398, 2000.

"When Indexing Equals Compression: Experiments with Compressing Suffix Arrays and Applications" by R. Grossi, A. Gupta, and J. Vitter, Proc. SODA '04, pp. 636-645, 2004.

"Advantages of Backward Searching—Efficient Secondary Memory and Distributed Implementation of Compressed Suffix Arrays" by V. Mäkinen, G. Navarro, K. Sadakane, International Symposium on Algorithms and Computation, pp. 681-692, 2004.

"Fast Text Searching for Regular Expressions or Automaton Searching on Tries" by R. Baeza-Yates and G. Gonnet, Journal of the ACM, vol. 43, no. 6, November 1996, pp. 915-936.

"A Block-sorting Lossless Data Compression Algorithm" by M. Burrows and D. J. Wheeler, Digital Equipment Corporation SRC Research Report, May 10, 1994.

"Compressed Full-Text Indexes" by G. Navarro and V. Mäkinen, ACM Computer Surveys, 2006.

SUMMARY OF THE INVENTION

It is an object of the present invention to provide a method of string searching that is more efficient for large volumes of data stored on a hard disk.

The first step of the present invention is receiving data in a computer system.

The second step is applying Burrows Wheeler transform to create a Ferragina-Manzini (FM) index.

The third step is marking a user-definable number of rows of the FM-index.

The fourth step is storing the last column of the FM-index as a wavelet tree in a user-definable number of data buckets.

The fifth step is storing the locations of the user-definable number of marked rows in each user-definable number of data buckets.

The sixth step is creating at least one data blocks, the at least one data blocks comprising the user-definable number of data buckets.

In the seventh step, for each data block, calculate the number of times each character appears in the data block before each user-definable number of data buckets and append the result to the data block.

The eighth step is creating a header block, the header block comprising an array containing the number of times each character appears in the last column of the FM-index before each at least one data blocks, the location of the end of each at least one data blocks and the location of the end of the data.

The ninth step is appending the header block to the at least one data blocks.

The tenth step is storing the header block and each at least one data blocks in a user-definable medium.

In the eleventh, and last, step if additional data is received in a computer system, returning to the first step to create an additional index, otherwise stopping.

By marking and sorting data in the manner described above, the present invention supports forward and backward searching, this speeds the search time.

Sorting data requests into blocks and completing all searches with index information already stored in memory before loading additional index information into memory also improve operation of searches.

BRIEF DESCRIPTION OF THE DRAWING

FIG. 2 is an example of the documents sorted according to the present invention; and FIG. 3 is an example using multiple documents.

DETAILED DESCRIPTION OF THE INVENTION

Figure 1:
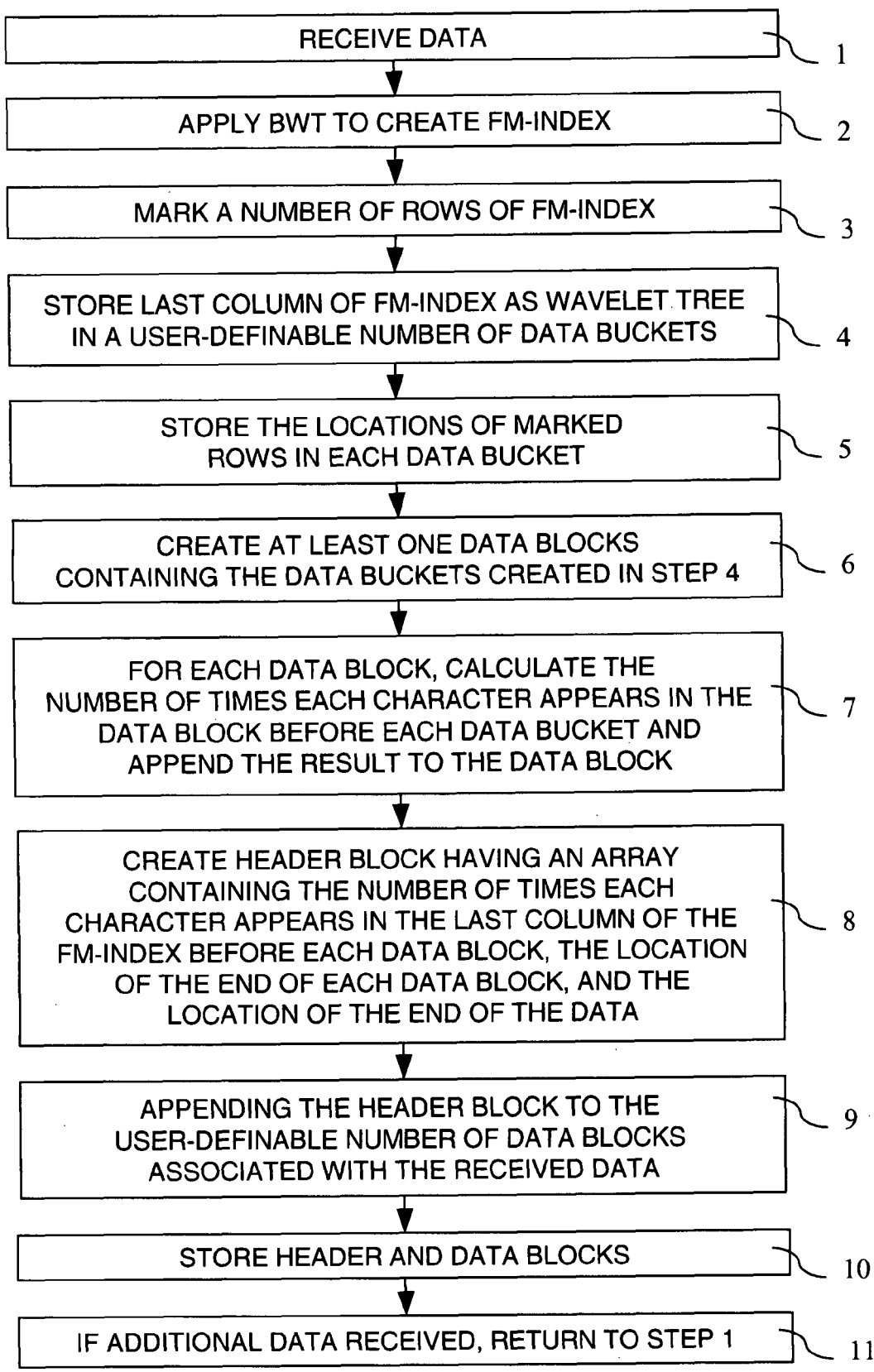
FIG. 1 is a flowchart of steps of the present invention.

The present invention is a novel method of creating an index for fast searching data on a hard disk.

FIG. 1 is a flowchart of the steps of the present invention.

The first step 1 of the preferred embodiment is receiving data in a computer system. Preferably, data is stored on a hard disk drive. Persons skilled in the art will recognize that the received data may be stored in any storage medium, such as a flash drive, etc.

The second step 2 of the preferred embodiment is applying Burrows Wheeler transform to create a Ferragina-Manzini index (FM-index).

The third step 3 of the preferred embodiment is marking a user-definable number of rows of the FM-index.

The fourth step 4 of the preferred embodiment is storing the last column of the FM-index as a wavelet tree in a user-definable number of data buckets.

The fifth step 5 of the preferred embodiment is storing the locations of the user-definable number of marked rows in each user-definable number of data buckets.

The sixth step 6 of the preferred embodiment is creating one or more data blocks, the one or more data blocks comprising the user-definable number of data buckets.

In the seventh step 7 of the preferred embodiment, for each data block, calculating the number of times each character appears in the data block before each user-definable number of data buckets and appending the result to the data block.

The eighth step 8 of the preferred embodiment is creating a header block. The header block computes an array containing the number of times each character appears in the last column of the FM-index before each one or more data blocks, the location of the end of each one or more data blocks and the location of the end of the data.

The ninth step 9 of the preferred embodiment is appending the header block to the one or more data blocks.

The present invention is made up of a single header block and many variable-length data blocks. The header block contains the C[ch] array, the end of each data block, and the occurrences of each character before the start of each data block. Each data block contains some number of buckets storing L column and marking data as well as the number of times each character appears before that bucket in the block. For some parameter k, rows that have offset mod k=0 in the block-matrix are marked. Each bucket has a succinct binary sequence storing a 1 for each marked row (and a 0 for each unmarked row) and a list of offsets. The L column data is stored in a wavelet tree inside each bucket. Lastly, for each chunk of h rows, the documents referred to by those rows are stored.

The tenth step 10 is storing the header block and each one or more data blocks in a user-definable medium.

In the eleventh, and last, step 11 if additional data is received in a computer system, returning to the first step to create an additional index, otherwise stopping.

In addition to supporting a backwards search, the present invention supports forward searching.

A forward step is $LF^{-1}(i)$; goes from the row beginning with T[j] to the row beginning with T[j+1]. By storing the occurrences for each character before each block in the header block, the present invention allows a forward step to operate in a constant number of block operations, which is a constant number of disk operations if the header block can be read in one disk operation. Note that the header block has size O(n/b), where b is the size of each block. In practice, 8 bytes are stored for each alphabet symbol for each block to record the occurrences before that block. If the block size is 16 MB, this procedure will create a header block of about that size when there are 8192 data blocks in the index—that is, when the total size is 128 gigabytes.

The present invention uses a different marking strategy than the prior art FM-index 2 implementation. Persons skilled in the art will recall that the FM-index 2 implementation adds a mark character every k characters to support locate queries. This strategy leads to problems when indexing data in which every byte is used, and it adds overhead because the marked character must be searched for in count queries. Instead of adding a mark character, the present invention stores a compressed binary sequence indicating which rows are marked. For each marked row, it stores the offset separately. Since the indexed data is not changed, only the query string must be searched for in count queries.

Each operation on the index can be expressed as a sequence of block requests. These requests query the index to find L[i] or Occ(ch,i) within a particular block. Each request is associated with a row number i, and may have a character ch. In order to service one of these block requests, the system must read the appropriate bucket from disk. Once the bucket is loaded, the system can service any number of block requests for that bucket with no extra I/O cost. To minimize the number of I/O requests, the search system guarantees that all block requests that could be satisfied with loaded data are satisfied before that block is dropped from the cache. The search system makes this guarantee with two techniques. First, it keeps the requests in a tree structure sorted by row. When it performs the requests, it goes through this tree structure in order, responding to the requests. Each query may add further requests when it receives a response. Second, whenever a new request is made, the system checks to see if the appropriate block is currently loaded. If so, it performs the request immediately. In this way, the system guarantees that any request that can be satisfied with a loaded block will be satisfied. It comes short of guaranteeing optimal order for servicing the requests, however, since a future request could add a request for a bucket that goes out of cache but that would have stayed in cache if the request was serviced in a different order. Despite this drawback, it does make a "best-effort" guarantee.

During a locate operation, the present invention permits steps both forward and backward at the same time to find a marked character. These forward and backward steps are continued independently until the task is done. This method works with the request sorting to give a speedup in locate operations for row ranges in the index. In particular, as a row range is stepped forward or backward, it becomes increasingly spread apart. By stepping both forwards and backwards, the present invention reduces this spreading. Note that the performance of this locate procedure remains O(k) index operations, where every $k^{th}$ character is marked.

It is possible to store multiple documents in an FM-index without concatenating the documents first. In particular, each row in the Burrows-Wheeler matrix can refer to a different document. These rows, taken together, will still function as an FM-index. However, the previous strategy of appending a single end-of-string character to the text will no longer work if the texts are to be suffix-sorted to find the ordering.

A benefit of the present invention is creating a FM-index that does not renumber its documents if more documents are added. Suppose that each document ends with a document number character which sorts smaller than the content characters. Note that in the sorted rotations, if row i is less than the number of documents, that row begins with the last character of document i. For example, suppose that the three documents are 'dab', 'ra', and 'ab'. We will make 'dab' document number 0, 'ra' document number 1, and 'ab' document number 2; thus the text to sort is 'dab0 ', 'ra1', and 'ab2'.

Looking at FIG. 2, note that the first column of the rotations sorted starting with the second character is the L column. Looking at the data in this way, as Burrows and Wheeler did in their original paper, it is clear that LF(i)=C[L[i]]+Occ(L[i],i)−1 since the C[L[i]] selects the section of the F column beginning with the proper character, and then Occ(L[i],i)−1 adds the index within those. Furthermore, the suffix sorting always corresponds to the sorted rotations, because the last character of each document is unique.

As an alternative to increasing the alphabet size in order to create the unique end-of-string markers, the document number could be multiple characters. However, assuming that the Burrows-Wheeler Transform is computed with a suffix sort, rows beginning inside these document numbers will not be in any particular order relative to the individual documents. Fortunately, as long as the characters within these document numbers are not searched, the unspecified order is not actually a problem. The preferred embodiment records the document numbers in binary, using the # character as a prefix to make them sort smaller than the other characters. Thus, the text to sort is 'dab#00$', 'ra#01$', and 'ab#10$'. Once we hit a $ or a # while searching, we know that we have to stop. This is shown in FIG. 3, and persons skilled in the art will recognize that it could be re-ordered arbitrarily because the suffix sort does not have enough information to completely reproduce the ordering for the rotations. The present invention handles multiple documents in this manner—by forcing the order when suffix sorting and then by never going past the '#' character while searching.

The present invention uses a scheme to improve the performance of /locate_documents/ queries. The /locate_documents/ problem is to find only the matching document numbers—ignoring the locations within those documents. In particular, the present invention divides the rows of the FM-index into chunks of size h. For each chunk, it stores a list of documents that are present in that chunk. When reporting the documents contained in a range of rows, the present invention does the normal locate procedure for the results in the partial first and last chunks. For each full chunk, it reads the set of matching documents directly. The list of document numbers stored in each chunk can be compressed using standard information retrieval methods. The present invention sorts each list, removes duplicates, and then encodes the differences in the document numbers with a gamma code.

Assuming that each chunk can be read in a single block operation, the number of block operations to locate the documents represented by occ matching rows is O(occ/h+hk), where h is the chunk size and k is the mark period. This is an improvement over the original O(occ·k) search time.

These chunks takes up O(n) space in the worst case. Suppose that the chunk size is h and the number of documents is d. We will consider two cases: d>h and d<h. In the first case, d>h, a chunk reaches a maximum size when there are h different documents in the chunk and these documents are equally spaced. Since the gamma code for x occupies 1+2 log$_2$(x) bits, we want max $$\sum_{i=1}^{h} 1 + 2\log_2 2(a_1)$$

where $$d = \sum_{i=1}^{h} a_i;$$

that is $$\max \log_2 \prod_{i=1}^{h} a_i,$$

which is the same as $$\max \prod_{i=1}^{h} a_i$$

under the constraint. By setting $$a_h = d - \sum_{i=1}^{h-1} a_i$$

and taking partial derivatives, it can be shown that the minimum is attained when $a_i = d/h$ for all i. Thus, in the worst case, there are h gamma-encoded differences, all equal to d/h, and so each chunk occupies h(1+2 log$_2$(d/h)) bits. There are (n/h) chunks, and so the total space of all of the chunks is n(1+2 log$_2$(d/h)) bits. That is, the chunks will take up space proportional to the size of the index. Note that n is measured in bytes, and so this addition to the index will take up less space than the original text as long as the factor is less than 8; that is, when h>d/11.3. In the second case, when d<h, there can only be d different documents in each chunk. Supposing that every document were in each chunk, the cost would be d bits per chunk; n(d/h) bits total. So for the chunks to take up less than n bytes, we have h>d/8. These relations suggest that setting h=pd, for some p>1/12, would be a good policy. Increasing p would decrease the space used in the chunks. At the same time, larger chunks mean that the searches will spend more time locating results in the boundary regions.

Typically, the unary code is 1s followed by a zero; however, zeros followed by a one is an equally valid version of the unary code. When the gamma code is written with the unary code ending with a one, it becomes simply the binary version of the number with some number of zeros prepended. This fact makes it easy to encode and decode the gamma code on a computer. In particular, decoding can operate by finding the leading number of zeros and then shifting the number the appropriate amount to the right. This translates to a fast method because the leading number of zeros can be computed with a few assembly instructions on modern hardware.

It is possible to merge two of the FM-index of the present invention, storing different documents to create a single index storing all of the documents. This procedure takes O(n) time, where n is the combined size of the indexes. The first part of the merge process is the algorithm backward merge. This function takes in a source index, a destination index, and a source document number. The new document is traversed backwards through both the source and destination indexes. The backward merge algorithm is similar to a method described in "Compressed Indexes for Dynamic Text Collections" by Ho-Leung Chan, Wing-Kai Hon, Tak-Wah Lam, and Kunihiko Sadakane. At each pair of rows, the destination index is "updated" and the character from the L column of the source index is placed after the destination index row.

Instead of immediately adding the new row to the destination index, the present invention adds the new row to an "update block" with the information from the source index. For each update, the update block contains the destination row number, the source row number, the corresponding character in the L column, and any location information for that row. Each update block has two sections; compressed updates and uncompressed updates. When updates are added to the update block, they are added as uncompressed updates. When the number of uncompressed updates reaches a threshold value, the updates are sorted and compressed. They are sorted by destination row number then source row number. Since these row numbers are sorted, they can be stored as gamma-encoded lists of differences.

Once the update blocks have been made for all of the documents in the source index, the update blocks are merged with the destination index and the values in the header block (such as the C array) are recomputed. This final merge step is straightforward because the update blocks have already recorded where the new information is to be inserted in the combined index.

While the preferred embodiments of the invention have been illustrated and described, it will be apparent to those of ordinary skill in the art that various changes and modifications may be made without deviating from the inventive concepts set forth above.

What is claimed is:

1. A method of indexing data on a computer, comprising the steps of:
    a) receiving data in a computer system, the received data stored in a user-definable storage medium;
    b) applying Burrows Wheeler transform to create a Ferragina-Manzini index, having rows and columns;
    c) marking a user-definable number of rows of the Ferragina-Manzini index;
    d) storing a last column of the Ferragina-Manzini index as a wavelet tree in a user-definable number of data buckets;
    e) storing the locations of the user-definable number of marked rows in each user-definable number of data buckets;
    f) creating at least one data blocks, the at least one data blocks comprising the user-definable number of data buckets;
    g) for each data block, calculating the number of times each character appears in the data block before each user-definable number of data buckets and appending the result to the data block;
    h) creating a header block, the header block comprising an array containing the number of times each character appears in the last column of the Ferragina-Manzini index before each at least one data blocks, the location of the end of each at least one data blocks and the location of the end of the data;
    i) appending the header block to the at least one data blocks;
    j) storing the header block and each at least one data blocks in a user-definable medium; and
    k) if additional data is received in a computer system, returning to step (a), otherwise stopping.

2. The method of claim 1, wherein the storage medium is one of a hard disk and flash memory.

3. A method of indexing and searching data on a computer, comprising the steps of:
    a) receiving data in a computer system, the received data stored in a user-definable storage medium;
    b) applying Burrows Wheeler transform to create a Ferragina-Manzini index, having rows and columns;
    c) marking a user-definable number of rows of the Ferragina-Manzini index;
    d) storing a last column of the Ferragina-Manzini index as a wavelet tree in a user-definable number of data buckets;
    e) storing the locations of the user-definable number of marked rows in each user-definable number of data buckets;
    creating at least one data blocks, the at least one data blocks comprising the user-definable number of data buckets;
    g) for each data block, calculating the number of times each character appears in the data block before each user-definable number of data buckets and appending the result to the data block;
    h) creating a header block, the header block comprising an array containing the number of times each character appears in the last column of the Ferragina-Manzini index before each at least one data blocks, the location of the end of each at least one data blocks and the location of the end of the data;
    i) appending the header block to the at least one data blocks to create a new index;
    j) storing the header block and each at least one data blocks in a user-definable medium;
    k) receiving multiple text strings to be searched in the new index;
    l) if a user-definable portion of at least one required data bucket is not loaded into memory, loading the user-definable portion of the at least one required data bucket into memory;
    m) searching for a first multiple text strings; and
    n) searching for remaining multiple text strings using the user-definable data buckets.

4. The method of claim 3, wherein the storage medium is one of a hard disk and flash memory.

5. The method of claim 4, wherein the step of searching for a first multiple text strings further comprises searching both forward and backward in the index.

6. The method of claim 5, wherein data search requests are sorted into blocks, and the index is searched for the requested data in the index loaded into memory before additional parts of the index are loaded.

7. The method of claim 6, further comprising the steps of:
    a) dividing the rows of the Ferragina-Manzini-index into user-definable number chunks of size h;
    b) for each user-definable number of chunks, storing a list of documents which are present in that chunk;
    c) compressing the list of document stored in each user-definable number of chunks using a user-selectable information retrieval method;
    d) sorting the list of documents in each user-definable number of chunks;
    e) removing duplicates in each user-definable number of chunks;
    f) encoding the differences in the document with a gamma code; and
    g) if the a user-definable block data request can be completed using one user-selected chunk, searching for user-definable data in the user-selected chunk, otherwise searching each user-definable number of chunks for matching data.

* * * * *